Aug. 7, 1934.  A. D. BLUMLEIN  1,968,806
ELECTROMAGNETIC PHONOGRAPH RECORDER
Filed July 29, 1931
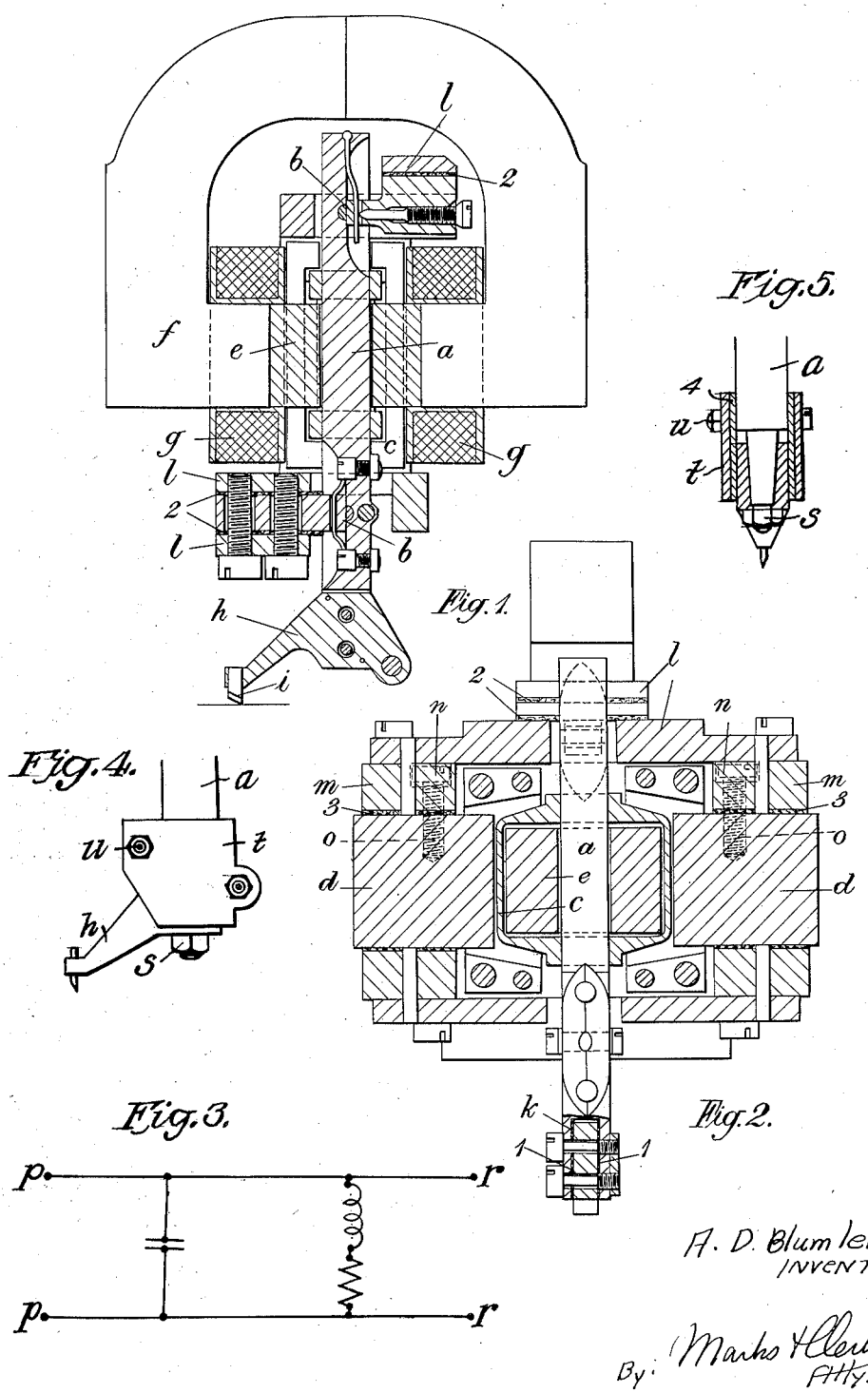
A. D. Blumlein
INVENTOR
By Marks & Clerk
Attys.

Patented Aug. 7, 1934

1,968,806

UNITED STATES PATENT OFFICE 1,968,806

ELECTROMAGNETIC PHONOGRAPH RECORDER

Alan Dower Blumlein, London, England, assignor to Columbia Graphophone Company, Limited, London, England Application July 29, 1931, Serial No. 553,902
In Great Britain September 12, 1930

9 Claims. (Cl. 179—100.41)

This invention relates to devices employed for the interconversion of electrical and mechanical energy, and is more particularly directed to devices of this character in which parts of the apparatus are set into vibration at varying frequencies, such as sound recording and reproducing devices.

In such apparatus it has been usual to introduce damping in the form of frictional or elastic forces imposed by material connected with the moving system whereby resonance of the system when vibrating in the manner intended (which we will call its authorized mode) is suitably controlled. It is usually possible, of course, that the system is capable of vibration in other unauthorized modes, such, for example, as vibrations within the moving system itself due to inherent flexibility or to flexibility of the supports: but in general the damping material introduced to suppress resonance in the authorized mode also serves to damp vibrations in unauthorized modes. If, however, for damping vibrations in the authorized mode forces other than frictional or elastic forces are employed, such, for example, as electric or electromagnetic forces, it sometimes, and quite usually, happens that such forces are completely ineffective in suppressing resonance of vibrations in unauthorized modes. Thus for example the whole rigid structure of the device may have a natural frequency in the working range at which, on account of lack of damping in any form, it will resonate at most undesirably large amplitudes under quite small forces.

The object of the present invention is to introduce means whereby the difficulties of damping the various vibrations of such apparatus may be successfully overcome and the invention consists in electromechanical interconversion apparatus wherein undesired or subsidiary resonances of a part or parts of the apparatus are damped by means which have substantially no damping effect upon the resonance, in its normal or desired manner of vibration, of the main vibrating member.

The invention further consists in electromechanical interconversion apparatus wherein resonance of the main vibrating member in its authorized mode is damped by electromagnetic means and resonance of one or more parts of the apparatus in unauthorized modes is damped by elastic or like means.

The invention also consists in electromechanical interconversion apparatus comprising a pivoted electric coil the resonant pivotal oscillations of which are damped electromagnetically, other resonant vibrations of parts of the apparatus, e. g. an arm carried by the coil shaft, etc., being damped by elastic means which do not directly affect the pivotal resonance of the coil.

Further features of the invention will appear from the following description of one modification thereof as applied to apparatus, in the form of a moving electric coil oscillating in an electromagnetic field, of the character described in the specification of U. S. A. patent applications Nos. 518,524 and 561,755 and employed for the recording of sound; but it must be understood that the invention is not limited to such a device since it is applicable to all forms of apparatus employed for the interconversion of vibratory electrical and mechanical energy, such as pick-ups, microphones, loud-speakers, oscillographs, etc.

The invention will be more readily understood from the following description of one modification thereof by reference to the accompanying drawing wherein:—

Figure 1 represents a side sectional elevation and

Figure 2 represents a front sectional elevation of a moving coil sound recording device embodying the invention.

Figure 3 represents diagrammatically the kind of circuit employed in accordance with the invention for providing electromagnetic damping; and Figures 4 and 5 represent in side and end elevation respectively a modified form of the invention.

The apparatus to be considered in the following description of one convenient manner of carrying the invention into effect is shown in Figures 1 and 2 and comprises essentially a stylus shaft $a$ of stiff and rigid construction, mounted upon knife edges $b$, $b$ and adapted to be subjected to rotational movements by an electrically conductive coil $c$ mounted upon it. This coil is positioned between magnetic pole pieces $d$, $d$ (Figure 2) which form the ends of an adjacent electromagnet (not shown). Within the coil is a core $e$ forming part of a second magnetic circuit $f$, (Figure 1) upon which are wound exciting coils $g$, $g$, so that the moving coil $e$ forms the secondary winding of a transformer of which the coils $g$, $g$ are primary windings. Electrical impulses generated by the sound to be recorded, (e. g. at a microphone) are fed to coils $g$, $g$ and induce corresponding impulses in the coil $c$ which under the influence of the magnetic field between the pole pieces $d$, $d$ thereupon oscillates about a vertical axis carrying with it the stylus shaft $a$ to which it is attached and a stylus arm $h$ attached to the bottom of the shaft $a$. The stylus arm $h$ carries at its outer end a sapphire or like cutting tool $i$ whereby a record may be cut in wax or similar material.

The circuits of the coils $g$, $g$ are so arranged that any undesirably large oscillations of the coil $c$ are damped by electromagnetic forces brought into play in the manner described in the U. S. A. patent applications referred to. According to the arrangements described therein a shunt is connected in parallel with the operative windings and the values of the elements forming the shunt circuit are so chosen that the impedance of the shunt will be low at the frequency or frequencies at which the oscillating mechanical system has resonance, but will be high at all other frequencies remote from that resonant frequency. The shunt may be a simple capacity and inductance in series, or of a more complicated form (such as described in the specification referred to) which may be necessary under various conditions which have to be considered. A diagrammatic representation of the kind of damping circuit which might be employed with a recorder of the kind shown in Figures 1 and 2 is shown in Figure 3 wherein a capacity is shown in parallel with a series inductance and resistance across the leads of the circuit, the speech current being fed to the terminals $p$, $p$, and the recorder being connected across the terminals $r$, $r$. If the moving system is in any way out of balance, however, forces may be introduced tending to bend the stylus shaft and set it into lateral vibrations. At most frequencies the strength of the shaft is sufficient to prevent such vibrations reaching any undesirable magnitude, but it will be appreciated that on account of its stiffness and its rigid mounting the shaft will have a very sharp and pronounced resonant frequency, and since the electromagnetic damping affects only the rotational movements, at this frequency vibrations of the shaft will be completely undamped. Very small forces at this frequency may therefore be sufficient to cause undesirable lateral vibrations of extremely large amplitude. In a similar way small out-of-balance forces from the stylus shaft, or from other parts of the moving system, may excite undesirable vibrations of appreciable amplitudes in associated parts of the assembly such as the rigid structure of the knife edge supports, for example, at the resonant frequencies of these parts. It will therefore be appreciated that there may be a number of frequencies at which resonant vibrations may be set up and that since these vibrations are undamped only very small forces are necessary to introduce them.

In order to prevent these undesirable parasitic oscillations occurring in the stylus shaft and framework in accordance with the invention I may introduce a very small amount of damping into these systems by interleaving very thin layers of cork or other suitable material between surfaced joints in the framework and/or also in stylus shaft assembly. In the type of such apparatus shown for example the stylus arm $h$ is attached to the stylus shaft $a$ by being clamped between a fork $k$ in the end of the latter. In this fork between the stylus shaft and the stylus arm may be inserted two pieces of cork 1, 1, (Figure 2) which are clamped by screws passing through the fork, these screws not touching the stylus arm. Thus the stylus arm makes no metallic contact with the stylus shaft but is clamped between two layers of cork. These layers of cork may be of any suitable thickness but are usually of a small order such as .003 inch thick; but they serve to provide just that small degree of damping that is necessary to prevent unauthorized oscillation of the stylus shaft. Similarly, the knife edges may be clamped between metal plates $l$ with interleavings of thin cork sheet 2, 2, and the end plates or blocks $m$ may have interleavings of cork 3, 3 between them and the pole pieces. The screws $o$ holding the blocks $m$ to the pole pieces may have between them and the blocks hard rubber bushings $n$ which, while serving to clamp the blocks, have sufficient resiliency to allow the cork interleavings to be effective in damping. These last interleavings 3, 3 of cork and the bushings $n$ serve not only to damp out oscillations in the main frame but also to insulate the blocks $m$ from the pole pieces and thus prevent a short-circuited turn being formed by the frame round the exciting magnetic circuit. In the case of the knife edge supports and if desired in the case of the connection between the blocks $m$ and the pole pieces the clamping screws pass through clearance holes in the supported member so that the only contact between the supported members and the supporting members is through the cork interleaving provided.

It is to be noted that the damping so introduced has no effect upon the rotational oscillation of the stylus shaft, but only serves to prevent the vibrations of the system in unauthorized modes, and further that since all the cork interleavings 1, 2 and 3 are so arranged that any relative movement of the members between which they are placed necessitates a shearing strain in the cork, any adjustment of tightness of the clamping screws in order to alter compression of the cork will not affect the relative position of the parts of the apparatus considered; for example the clearance between the moving coil and the pole pieces will not be affected by increasing the tightness of the knife edge clamping screws.

This method of damping unauthorized modes of vibrations is applicable to any electromechanical device, but is usually only necessary in cases where the damping provided to suppress the main resonance in the authorized mode is of such a form that it produces no damping in unauthorized modes of vibration. It is therefore particularly applicable to electromagnetically damped devices.

The invention is not limited only to cork interleavings; rubber or other suitable material may be used instead. An advantage of cork is that it may conveniently be obtained in thin sheets and that the introduction of these sheets does not allow sufficient relative movement of the connected parts to spoil the alignment etc. of the device.

A modified method of introducing damping for parts of the system liable to vibrate in unauthorized modes at their resonant frequencies is to combine with the member or members tending to bend, one or more additional strengthening members, the contacting surfaces being interleaved with cork or other suitable damping materials in the manner described. Thus two points liable to have unauthorized relative movement during vibration in the authorized mode, or two parts of the member likely to bend relative to one another may have clamped thereto an additional stiff member, washers of cork being interposed between the parts and the added member for damping relative oscillation.

Such an arrangement is shown for example in Figures 4 and 5 which represent the lower end of a driving shaft $a$ provided with a stylus arm $h$ which fits on to a narrowed, tapered portion of the shaft, as shown, and is held tight by a nut $s$. To stiffen the assembly two plates $t$ are clamped together by nuts and bolts $u$, embracing between them both the shaft $a$ and the stylus arm $h$, while to damp out any vibrations of the stylus arm relative to the shaft, which might arise as the result of flexure of the tapered portion of the shaft, thin interleaving sheets 4 of cork or stiff rubber are inserted between the shaft and stylus arm, and the clamping plates.

It is to be understood that the invention is not limited to any particular details given in the above description, since it may be applied to any form of electromechanical conversion apparatus, and to any points in the apparatus other than or in addition to the particular places described, where such damping is desired. Further I may vary the material, form, disposition and relative association of the damping interleavings and/or the parts of the apparatus in accordance with various requirements to be fulfilled without departing from the scope of the invention in any way.

Having now described my invention, what I claim as new and desire to secure by Letters Patent is:—

1. In an electromagnetically damped device for the interconversion of electrical and mechanical energy comprising a member adapted to oscillate in an authorized mode and electromagnetic means for damping resonant vibrations of said member only in its authorized mode, yieldable damping means having only small resiliency adapted to damp only vibrations of said member in unauthorized modes.

2. In an electromagnetically damped device for the interconversion of electrical and mechanical energy comprising a member formed of a plurality of parts connected together and adapted to oscillate in an authorized mode, and electromagnetic means for damping resonant vibrations of said member only in its authorized mode, yieldable damping means having only small resiliency adapted to damp only oscillations between said interconnected parts.

3. In an electromagnetically damped device for the interconversion of electrical and mechanical energy comprising a member adapted to oscillate in an authorized mode and another member formed of a plurality of parts, connected together, upon which said oscillatory member is mounted, and electromagnetic means for damping resonant vibrations of said oscillatory member only in its authorized mode, yieldable damping means having only small resiliency adapted to damp only vibrations between said interconnected parts of said supporting member.

4. In an electromagnetically damped device comprising a plurality of parts connected together to form a member adapted to oscillate in an authorized mode and a supporting member for said oscillatory member, and electromagnetic means for damping resonant vibrations of said oscillatory member only in its authorized mode, interleavings or packings of yieldable material having only small resiliency between various interconnected parts forming respectively said oscillatory member and said supporting member, adapted to damp only vibrations between said parts.

5. In a device according to claim 4, a magnetic system around said oscillatory member comprising a pair of pole-pieces clamped to frame blocks and interleavings of yieldable material having only small resiliency between said pole-pieces and said frame blocks.

6. In a device according to claim 4, a pivotally mounted electric coil, a magnetic system around said coil, bearing supports for said coil clamped to parts of said magnetic system, and interleavings of yieldable material having only small resiliency, between said bearing supports and the parts to which they are clamped.

7. In a device according to claim 4, an oscillatory member comprising an electric coil attached to a supporting shaft, an arm attached to and extending radially from said shaft, and interleavings of yieldable material having only small resiliency, between said shaft and said radially projecting arm attached thereto.

8. In an electromagnetically damped device for the interconversion of electrical and mechanical energy comprising a member adapted to oscillate in an authorized mode and electromagnetic means for damping resonant vibrations of said member only in its authorized mode, additional strengthening or stiffening members attached to said oscillatory member and interleavings of yieldable material having only small resiliency, between said additional members and said oscillatory member, whereby only unauthorized vibrations of said oscillatory member are prevented.

9. In a device according to claim 1, thin interleavings of cork between parts of said device, forming said yieldable damping means of small resiliency.

ALAN DOWER BLUMLEIN.